US012747811B1

(12) United States Patent
Quesada

(10) Patent No.: US 12,747,811 B1
(45) Date of Patent: Sep. 29, 2026

(54) SNAP-FIT SEALING GASKET WITH RIGID REINFORCING RING AND USE OF THE SAME IN FORMING A JOING IN A FLUID CONVEYING PLASTIC PIPELINE

(71) Applicant: S & B Technical Products, Inc., Fort Worth, TX (US)

(72) Inventor: Guido Quesada, Santa Ana (CR)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 19/283,437

(22) Filed: Jul. 29, 2025

(51) Int. Cl.
*F16L 21/03* (2006.01)
*F16J 15/02* (2006.01)
*F16L 21/02* (2006.01)

(52) U.S. Cl.
CPC ............. *F16L 21/03* (2013.01); *F16J 15/025* (2013.01); *F16L 21/02* (2013.01)

(58) Field of Classification Search
CPC ......... F16L 21/03; F16L 21/02; F16L 21/025; F16L 17/025; F16J 15/025
See application file for complete search history.

(56) References Cited

U.S. PATENT DOCUMENTS 3,315,971 A * 4/1967 Sakurada
4,061,459 A * 12/1977 Parmann
4,299,412 A * 11/1981 Parmann ................. F16L 21/03
4,368,894 A * 1/1983 Parmann ................. F16L 21/03
5,213,339 A * 5/1993 Walworth ............... F16L 21/03
6,328,309 B1 * 12/2001 Corbett, Jr. ............. F16L 21/02
6,499,744 B1 * 12/2002 Quesada ................. F16L 21/03
D556,866 S * 12/2007 Darce
7,392,989 B2 * 7/2008 Corbett, Jr.
7,441,319 B2 * 10/2008 Corbett, Jr .............. F16L 21/03
7,461,848 B2 * 12/2008 Corbett, Jr. ............. F16L 21/03
7,513,536 B2 * 4/2009 Corbett, Jr .............. F16L 21/03
10,359,137 B1 * 7/2019 Keil ........................ F16L 21/03
10,648,602 B2 * 5/2020 Quesada ............... F16L 17/025
2004/0130103 A1 * 7/2004 Corbett, Jr. ............. F16L 21/03

* cited by examiner

*Primary Examiner* — William S. Choi
(74) *Attorney, Agent, or Firm* — Charles D. Gunter, Jr.

(57) ABSTRACT

A snap-fit pipe sealing gasket is shown for receipt within a preformed groove provided within the belled, socket end of a female plastic pipe. The snap-fit sealing gasket has a gasket body formed of resilient material with a rigid reinforcing retainer ring embedded therein which circumscribes the gasket body. The gasket body can be flexed so that it can be installed within the preformed pipe groove after pipe manufacture. The gasket body has a nose region which is precisely sized so that the rigid reinforcing ring ends up being positioned at a particular location relative to a lower, intermediate planar region of the gasket body and the nose tip of the gasket. This location provides needed support for the rigid ring, while avoiding interference with the deformation of the gasket lip as the mating male pipe end is inserted during the pipe joint assembly.

9 Claims, 4 Drawing Sheets

SNAP-FIT SEALING GASKET WITH RIGID REINFORCING RING AND USE OF THE SAME IN FORMING A JOING IN A FLUID CONVEYING PLASTIC PIPELINE

BACKGROUND OF THE INVENTION

1. Field of the Invention

The present invention relates generally to sealing gaskets used for pipe joints in plastic pipelines in which a male spigot pipe section is installed within a mating female socket pipe section and, more specifically, to an improved sealing gasket and installation method for installing a snap-fit gasket within a preformed gasket groove in a section of plastic pipe used to form a pipe joint.

2. Description of the Prior Art

Pipes formed from thermoplastic materials including polyolefins such as polyethylene, polypropylene and PVC are used in a variety of industries. For example, such pipes are commonly used in the waterworks industry in municipal water and sewer applications. In forming a joint between sections of pipe, the spigot or male pipe end is inserted within the female or socket pipe end. The actual manufacture of the mating sections of plastic pipe typically involves the reforming of the socket end of the pipe by reheating and shaping to some desired profile to provide a means of mating with the opposing spigot end of the next pipe. The art of forming sockets (also called bells) on plastics pipes is well established, and there are numerous processes and methods in the literature.

To achieve a fluid seal, an annular, elastomeric ring or gasket is typically seated within a groove or A raceway@ formed in the socket end of the thermoplastic pipe. The seal ring assists in forming a sealed pipe joint between adjoining sections of pipe. Various types of sealing technologies have been employed to assure the sealing integrity of the pipe joint. Prior art pipe gasket sealing systems are known in which a homogeneous rubber gasket was generally deformable, allowing it to be flexed or bent by hand, and inserted within a mating internal raceway formed in the female, belled pipe end. The raceway in the female pipe bell end was pre-formed, as by using a collapsible mandrel belling tool, at the pipe manufacturing facility. One prior art attempt to ensure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring for the gasket body, with a stiffening band which was inserted into a mating recess provided on the internal diameter of the rubber ring, or an internal reinforcing metal band or ring within the rubber gasket body.

One advance in the sealing arts was the introduction of the so-call "Rieber" belling manufacturing process, introduced into the industry in the early 1970's, which will be familiar to those skilled in the relevant industry. This technology was developed by Gunnar Parmann of Rieber & Sons of Bergen, Norway, which is now referred to in the industry as the "Rieber Joint." In manufacturing a Rieber Joint, the sealing gasket is placed on a mandrel of a belling machine and the heated and softened female socket pipe end is pushed up and over the sealing gasket. The pipe end is then allowed to cool and the mandrel is retracted leaving the ring shaped elastomeric sealing gasket locked in place within an internal groove formed within the mouth region of the female, socket bell pipe end.

The above discussion is intended to be merely illustrative of industry efforts to address problems of sealing integrity in plastic pipe systems of the type used, for example, in the waterworks industry for water and sewer lines. In general, the prior art attempts have been directed toward traditional (normal) polyvinylchloride (PVC-U) pipe materials. However, in recent years, pipe systems employing molecularly oriented pipe and particularly the so called A PVC-O@ pipe have become increasingly popular. The designation A PVC-O@ stands for polyvinylchloride oriented, sometimes referred to simply as molecularly oriented pipe.@ It is well established in the literature that molecular orientation of plastics can provide enhanced mechanical properties for plastic pipe of the type under consideration. Orientation is achieved by drawing or stretching the material under appropriate conditions of temperature, such that a strain (i.e., deviation from the originally formed dimensions) is induced in the plastics material to cause alignment of the molecules, and thereafter cooling the material while drawn to lock in that strain. Those skilled in the relevant pipe arts will be familiar with these manufacturing techniques.

Modern PVC-O pipe joints typically utilize a socket pipe end that is provided with an A Anger™ Raceway@ for receiving the sealing gasket. An advantage of PVC-O pipe is that it can be thinner with the same general strength as traditional PVC pipe. However, the Anger™ Raceway has a different geometry than the traditional socketed grooves provided in the more traditional A Rieber" gasket sealing systems for traditional PVC pipe. The so-called "triangular" or "30/60 degree" geometry of the Anger™ raceway has proved to be a more difficult problem from the standpoint of providing a securely sealed joint than the traditional PVC pipe joint.

Also, despite the advances offered by the Rieber process, the belling operation was somewhat complicated and costly. Also, certain situations exist in which it would be desirable to install a gasket within a preformed groove in the selected pipe end, rather than utilizing an integrally installed gasket in which the groove in the pipe is formed around the gasket, as in the Rieber process.

U.S. Pat. No. 7,441,319, to Corbett, Jr., et al, issued Oct. 28, 2008, shows a snap-fit gasket with a precisely located internal retainer ring for triangular pipe grooves. This patent showed the importance of locating the steel ring towards the front of the nose of the gasket to make installation easier, while avoiding a location that would result in a loss of the ability to retain the gasket firmly in position inside the raceway under pressure conditions. However, at this point in time, the importance of providing adequate support for the rigid reinforcing ring was not appreciated. In fact, a small gap existed under the nose region of the gasket shown in the '319 Corbett patent and the importance of filling this space to support the reinforcing ring is not discussed and was apparently underestimated.

Thus, in spite of the advances in the art which have been described with respect to sealing systems for use in plastic pipe joints, a need continues to exist for improved techniques for manufacturing and joining plastic pipe, particularly with molecularly oriented pipe such as PVC-O pipe, which techniques take into account the unique properties of these types of molecularly oriented plastic materials.

A need also exists for such a sealing system for belled pipe ends having preformed grooves or raceways in which the sealing gasket can be "snap-fit" into the preformed raceway after the pipe manufacturing process is complete.

A need also exists for such a "snap-fit" gasket which has improved sealing properties under pressure conditions.

SUMMARY OF THE INVENTION

The present invention has, as one object, to provide an improved pipe sealing gasket for use in pipe joints which offers the advantage of a Rieber type locked-in seal while allowing the gasket to be installed in a preformed groove after the groove is preformed during manufacture, or downstream from the pipe manufacturing process.

The improved sealing gasket of the invention has a body formed of a flexible elastomeric material and has a relatively rigid reinforcing ring which is located at an embedded location which circumscribes the gasket body at one circumferential location. Preferably, the relatively rigid ring is made of a metal such as steel or a rigid plastic or composite and is generally round in cross-section. The relatively rigid ring tends to resist axial forces tending to displace the gasket from the belled pipe end annular groove or raceway when in position within the raceway. The embedded location of the ring is precisely determined to allow the gasket to be obliquely inserted within the bell end of the pipe and subsequently snap-fitted into position in the annular groove while securely retaining the gasket in position, whereby the gasket is securely retained in a locked-in position within the preformed groove in the pipe belled end.

In addition to precisely locating the rigid reinforcing ring, the improved sealing gaskets of the invention demonstrate dramatic improvements in performance by extending and thickening the gasket nose region according to certain fixed design criteria. The changes in shape and geometry of the gasket have been shown to prevent gasket blow-out during pressure testing at twice the rated pressure, a greatly unexpected result. The improved pipe joint of the invention has particular applicability where the pipe sealing system is a system incorporating components made of molecularly oriented pipe, such as PVC-O pipe systems, but offers advantages with traditional materials, such as PVC-U piping systems, as well.

More particularly, an improved snap-fit pipe sealing gasket is shown which is designed for receipt within a preformed groove provided within a female socket end of a joint of thermoplastic pipe. The snap-fit pipe sealing gasket of the invention has a ring-shaped elastomeric body having a substantially homogeneous composition which, when viewed in cross section, includes a leading nose region which terminates in a nose tip. The leading nose region is connected to a downwardly extending compression region by an intermediate planar region which forms a flat surface generally parallel to a horizontal axis drawn parallel to a central axis of the thermoplastic pipe. This intermediate planar region has a length "$l_1$" which is critical to the functioning of the gasket in terms of improved performance under pressure. The leading nose region faces generally towards the female socket end of the thermoplastic pipe once the gasket is inserted within the pipe.

The gasket leading nose region is joined to the intermediate planar region by a leading sloped surface region which defines an angle $\alpha$ with respect to the horizontal axis drawn parallel to a central axis of the pipe. The leading sloped surface region forms an alignment ramp to guide a mating spigot end during insertion. The downwardly extending compression region comprises an evenly sloping outer face of the gasket body which forms a lip region thereof. The lip region is separated from a trailing outer face of the gasket body by means of a V-shaped opening which defines a second angle $\beta$. The lip region of the gasket contacts the exterior surface of the mating male, spigot pipe end during assembly to form a primary sealing surface for the pipe joint. The V-shaped opening allows the lip region to bend inwardly as the mating male spigot end of the mating pipe section encounters the flexible lip region of the gasket. The outer face of the gasket body forms a convex outer arcuate region which connected to the nose region at the front of the gasket by a uniformly sloping exterior gasket surface.

The gasket body also having a rigid reinforcing ring embedded therein which circumscribes the gasket interior at one circumferential location. The rigid reinforcing ring has a defined mid-point and a defined ring diameter or thickness which is preferably on the order of 2.0 to 7.0 mm for most applications, more preferably on the order of 2.7 to 6.2 mm and most preferably about 5.7 mm for one example shown. The rigid reinforcing ring is positioned within the body of the gasket so that the intermediate planar region extends in length at least one ring thickness towards the tip of the nose region, and wherein the reinforcing ring is located so that there is a distance of at least one ring thickness between the rigid reinforcing ring and the intermediate planar region. These measurements, one taken axially along the length "$l_1$" of the intermediate planar region and one taken in a direction generally normal thereto, result in a ring placement such that the ring is adequately supported by the surrounding rubber of the gasket body. This added support in the nose region of the gasket body results in unexpected improvements in performance under pressure.

In addition, most preferably, the gasket body at the nose region has a nominal internal diameter and the mating spigot pipe end has a nominal outer diameter, and wherein the nose nominal internal diameter is approximately equal to the nominal spigot outer diameter.

The dimensions of the gasket body are also selected so that the gasket can be installed within the preformed groove in the female pipe end by temporarily transforming the sealing gasket from a generally cylindrical shape to a generally elliptical shape. In practice, the gasket body is installed within the mouth opening of the bell end of the plastic pipe with the gasket body being initially oriented at an oblique angle with respect to a longitudinal work axis such that a trailing edge of the gasket body engages the preformed groove, and a leading edge of the gasket body is moved past the preformed groove provided in the bell end. Thereafter, the gasket body can be finally installed within the preformed groove by exerting a retracting force on the gasket body by pulling the leading edge thereof backwards in the direction of the mouth opening of the female pipe end until the gasket again assumes a generally cylindrical shape and snaps into a locked-in position within the preformed groove.

Additional objects, features and advantages will be apparent in the written description which follows.

DETAILED DESCRIPTION OF THE INVENTION

Figure 1:
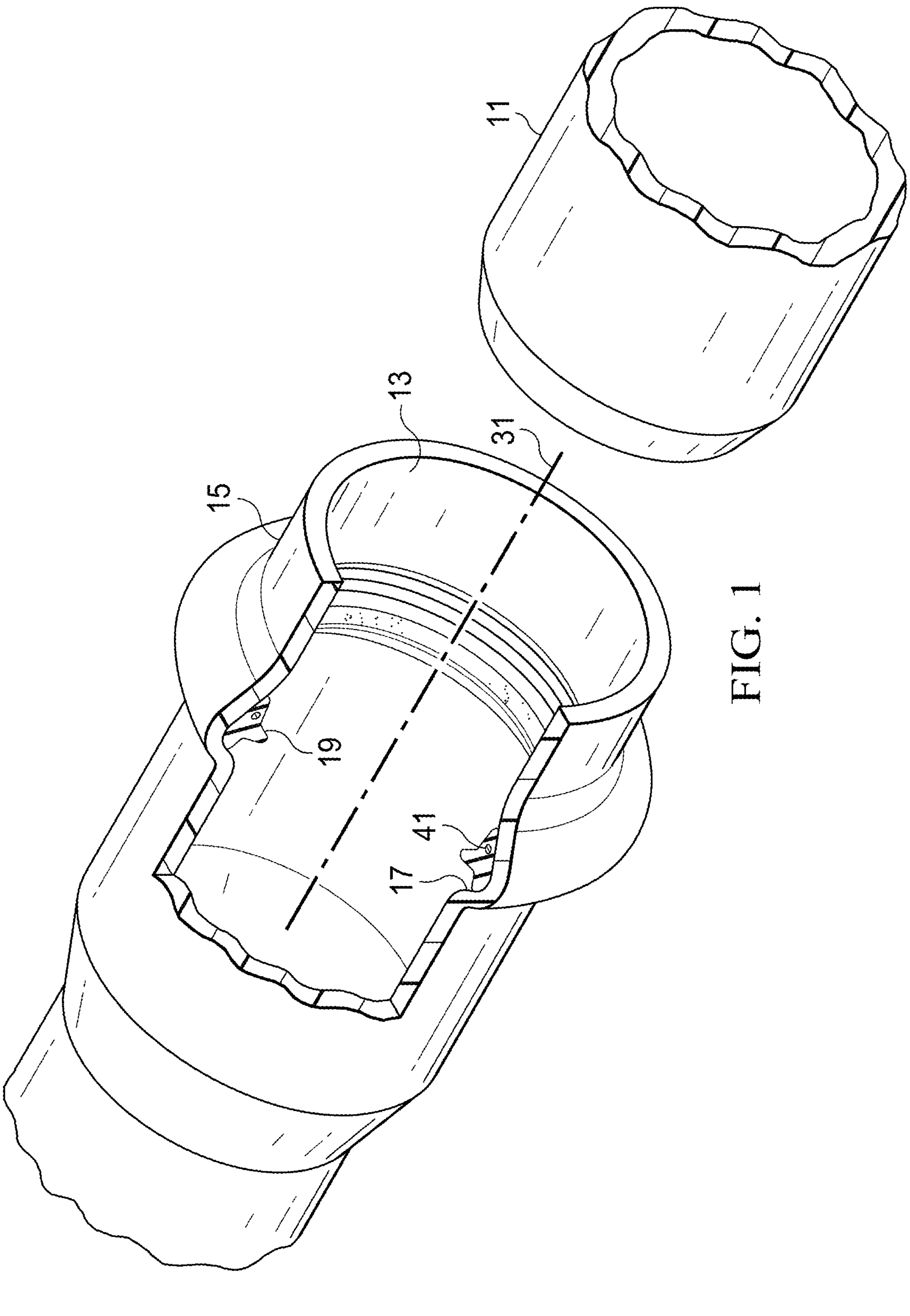
FIG. 1 is a partial perspective view of a portion of a male, spigot pipe end about to enter the mating belled, female pipe end having the pipe sealing gasket of the invention installed within a preformed groove provided in the mouth opening of the female pipe end.

As mentioned briefly in the Background section, plastic pipe systems are commonly used at the present time for a multitude of tasks including the conveyance of drinking water, waste-water, chemicals, heating and cooling fluids, foodstuffs, ultrapure liquids, slurries, gases, compressed air and vacuum system applications, both for above and below ground applications. Plastic pressure pipe systems have been in use in the United States for potable (drinking) water systems since at least about the 1950s. The types of plastic pipe in commercial use in the world today include, for example, unplasticized polyvinyl chloride (referred to as PVC or PVC-U), acrylonitrile butadiene styrene (ABS), post chlorinated polyvinyl chloride, (CPVC), polypropylene (PP), polyethylene (PE), polyvinylidene fluoride (PVDF) and polybutylene (PB) and more recently the so-called "molecularly oriented plastics."

As has been briefly discussed, the present invention has particular applicability to sealing and restraint systems where this newer form of plastic material is used in the plastic pipe manufacture. These plastic pipe materials, which will be familiar to those skilled in the relevant arts, are referred to as, for example, "PVC Molecularly Oriented Pipe", sometimes called "PVC-O pipe" or simply molecularly oriented pipe for simplicity. Techniques for manufacturing such pipe materials are known. The end result is a molecularly oriented thermoplastic pipe material which typically exhibits enhanced strength in certain directions due to orienting the molecules in the plastic material in such direction, whereby the tensile strength of the plastic increases and the stretch decreases in such direction. This can provide advantages, for example when applied to tubular articles, where orienting is effected in the radial direction, for instance to increase the pressure resistance of the pipe, or in the longitudinal direction of the pipe, for instance to increase the tensile strength of the pipe, or in both directions (biaxial orientation).

In the case of PVC-O pipe systems for municipal water and sewer pipe, the molecular orientation approximately doubles the material strength, so that only about half the wall thickness for the same pipe class is required to be used to meet the applicable specifications. In the discussion which follows, the term "PVC-O" pipe will be taken to mean molecularly oriented pipe generally of the type used in the water and sewer industries. The technique is well adapted to sockets formed, for example, by the Molecor™ process, for example, where the female pipe socket is formed before installing the sealing gasket.

As has been briefly discussed, problems have existed in the past in providing PVC-O pipe with effective and workable sealing systems, due in part to the unique characteristics of the molecularly oriented pipe material itself. The problem is exacerbated in the case of PVC-O pipe joints in that the female, belled socket end is often provided with what is called an A Anger™ Raceway@ for receiving the sealing gasket. PVC-O pipe, unlike ordinary PVC pipe, with its more "triangular" shape in cross section, is typically provided with what is called a A 30/60 degree" internal circumferential groove or raceway. A raceway with this general shape is referred to as the A Anger Groove™@ in the waterworks industry. The Anger™ pipe manufacturing method is described, for example, in U.S. Pat. No. 4,379,115, issued Apr. 5, 1983 to Seach et al., and in various other references. As has been noted, a principal advantage of PVC-O pipe is that it can be thinner with the same type strength as traditional PVC pipe. However, since the Anger Raceway™ has a different geometry than the traditional socketed grooves provided in the more traditional A Rieber@ gasket sealing systems for traditional PVC pipe, this different geometry must be taken into account.

Figure 4:
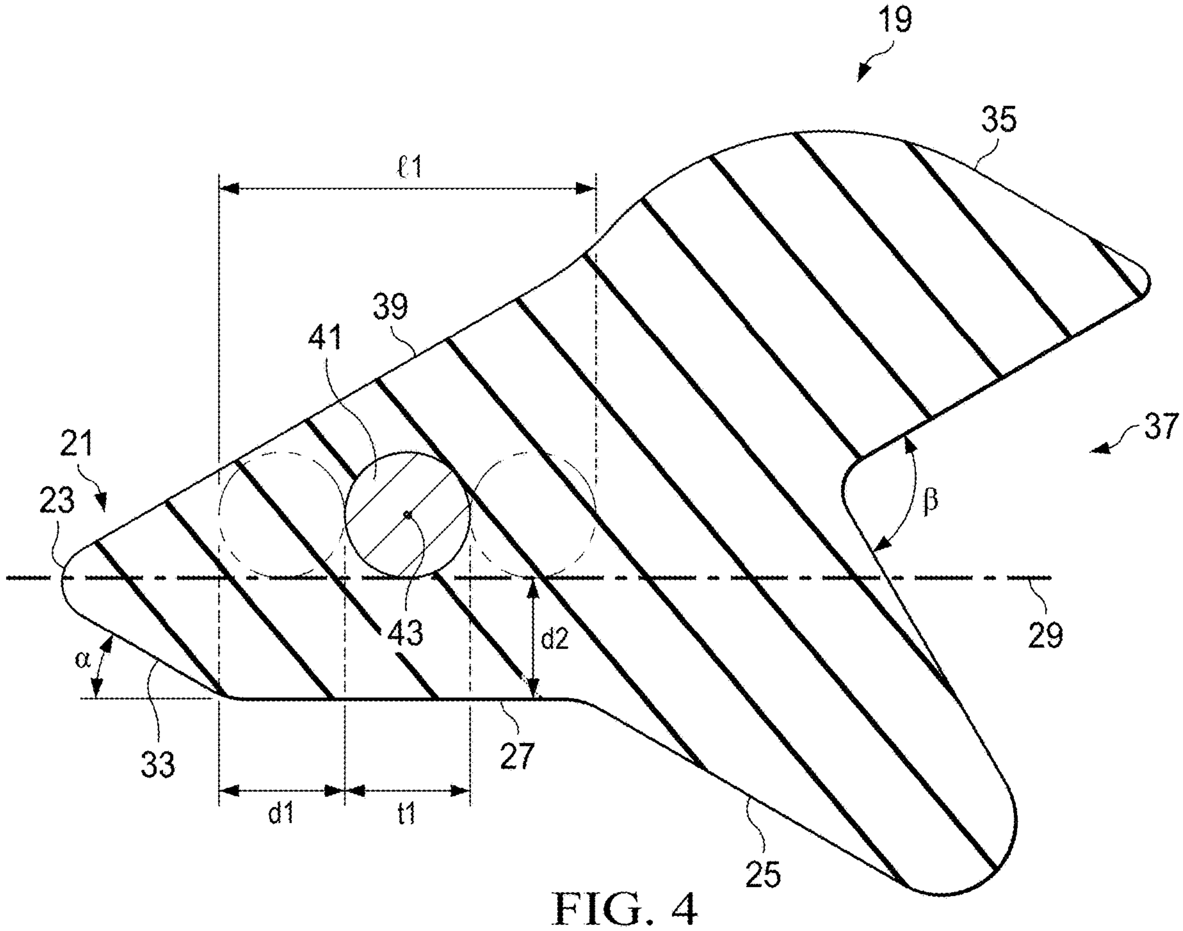
FIG. 4 is a cross-sectional view of the gasket of the invention, taken along lines 4-4 in FIG. 2.

FIG. 4 is a cross-sectional view of a pipe sealing gasket of the invention, designated generally as 19. As has been described, the gasket 19 is designed to be installed within a "preformed" groove which is provided within the mouth region of the mating female belled pipe end. Such a groove is shown as 17 in FIG. 1 of the drawings. It is shown as having the "more relaxed shape" typical of the Anger® type groove for PVC-O pipe. By "preformed" is meant that the gasket receiving groove was formed at the pipe manufacturing facility with the intention that a sealing gasket then be installed in the groove at the factory, or that a gasket be later installed in the field. This terminology is intended to distinguish "Rieber" style pipe belling processes in which the sealing gasket is simultaneously sealed during the pipe belling operation.

The sealing gasket 19 of FIG. 1 is received within the internal raceway or groove 17 of the female, belled pipe end 15 in a region adjacent the mouth opening 13 thereof. When the mating male, spigot pipe end 11 is received within the mouth opening 13 of the female pipe end and is inserted to a stop point to form the pipe joint, the sealing ring 19 forms a seal with the male pipe exterior surface.

Figure 2:
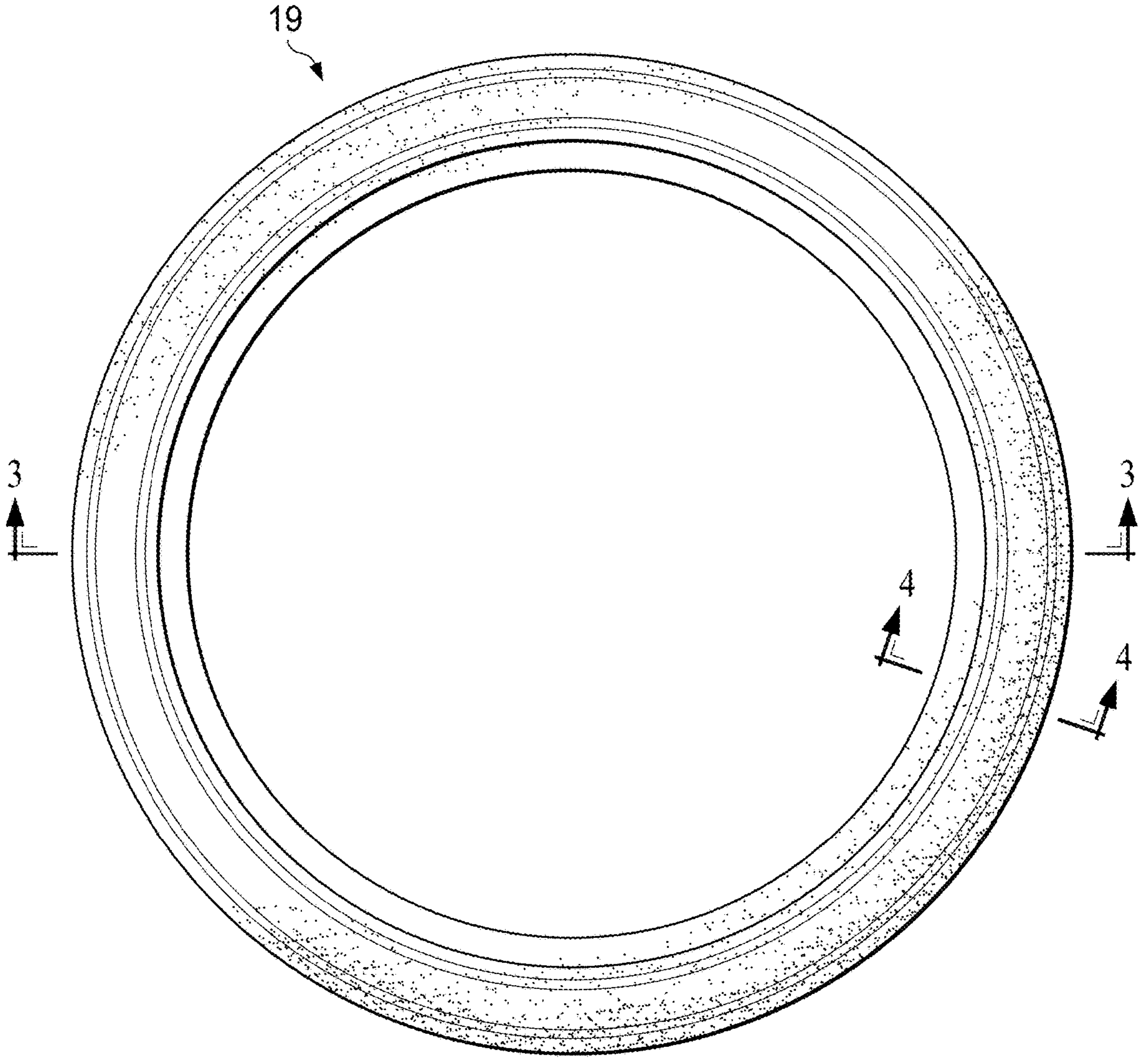
FIG. 2 is a top view of the gasket of the invention.
Figure 3:
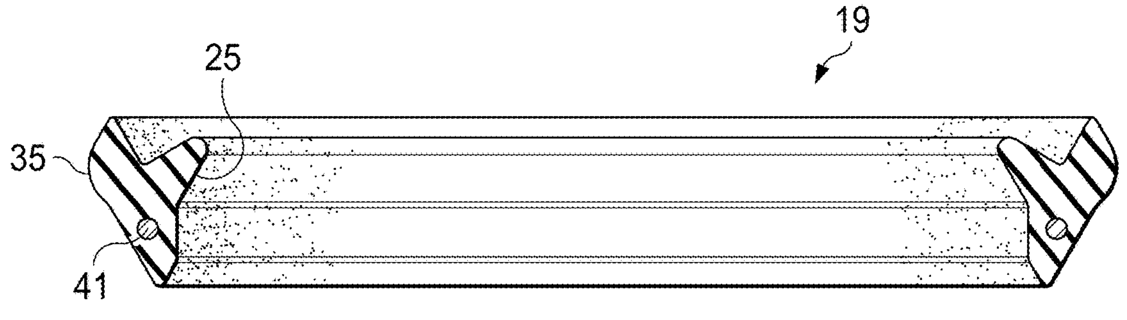
FIG. 3 is a partial sectional view of the gasket of the invention, taken along lines 3-3 in FIG. 2.

As will be appreciated from FIGS. 2-4, the sealing gasket of the invention is a ring-shaped elastomeric body having a substantially homogeneous composition which, when viewed in cross section, includes a leading nose region 21 (FIG. 4) which terminates in a nose tip 23. The leading nose region 21 is connected to a downwardly extending lip region 25 by an intermediate planar region 27 which forms a flat surface generally parallel to a horizontal axis 29 drawn parallel to a central axis (31 in FIG. 1) of the thermoplastic pipe. As will be appreciated from FIGS. 1 and 4, the leading nose region 21 faces generally towards the female socket end of the thermoplastic pipe once the gasket is inserted within the pipe. The gasket body can be formed of any of a number of flexible elastomeric materials. The exact elastomer used will vary in composition depending upon the end application, but may include natural and synthetic rubbers, for example, SBR, EPDM, NBR, nitrile rubber, etc.

Returning to FIG. 4, the tip of the nose region 23 can be seen to be joined to the intermediate planar region 27 by a leading sloped surface region 33 which defines an angle $\alpha$ with respect to the horizontal axis 29 drawn parallel to a central axis of the pipe 31, wherein the leading sloped surface region 33 forms an alignment ramp to guide a mating spigot end during insertion. In the example shown in the drawings, the angle $\alpha$ is approximately 30°.

The downwardly extending lip region 25 of the sealing gasket comprises an evenly sloping outer face of the gasket body which forms a lip shape. The lip region is, in turn, separated from a trailing outer face 35 of the gasket body by means of a V-shaped opening 37 which defines a second angle $\beta$. In the example shown, the angle $\beta$ is approximately 90°. The V-shaped opening 37 allows the lip region (generally at 25) to bend inwardly as the mating male spigot end (11 in FIG. 1) of the mating pipe section encounters the lip region of the gasket, forming a primary sealing action for the pipe joint. The outer face of the gasket body 35 forms a convex outer arcuate region which is connected to the nose region 21 by a uniformly sloping exterior gasket surface 39. The outer face and sloping exterior surface 39 of the gasket contact the raceway groove (17 in FIG. 1) in the female, belled pipe end to form a seal. The angles α and β are selected to minimize the insertion force required when inserting the mating spigot end within the female socket pipe end while still maintaining a fluid tight seal between the pipe sections.

The sealing gasket body also contains a relatively rigid reinforcing ring (41 in FIG. 4) embedded therein. The relatively rigid ring can be made of a variety of relatively rigid materials, such as metals, rigid plastics and composites, but is preferably made of steel. The relative rigid ring is generally round in cross-section and has a mid-point 43. As shown in FIG. 1, the ring circumscribes the annular body of the sealing gasket at one embedded, circumferential location. In the example shown in FIG. 4, the rigid reinforcing ring has a defined ring diameter or thickness which is preferably on the order of 2.0 to 7.0 mm, more preferably on the order of 2.7 to 6.2 mm, and most preferably about 5.7 mm for the example shown for DN600 pipe. "DN" stands for nominal inside diameter. As will be understood by those skilled in the relevant arts, it is a measure of the approximate inner diameter of plastic pipe and fittings typically expressed in "mm" and is a standardized way to represent pipe sizes, ensuring compatibility across different manufacturers and systems.

The positioning of the rigid reinforcing ring 41 and the fact that the nose region of the gasket is consequently thickened and extended in shape are critical factors in the practice of the invention. The rigid ring will generally be on the order of 2.0 to 7.0 mm in diameter or thickness, because larger rings would cause installation problems and smaller rings might not provide sufficient retention force for holding the gasket in place in the belled pipe raceway during pressure conditions. For DN600 pipe, with a ring 41 of approximately 5.7 mm in diameter, the rigid reinforcing ring 41 is positioned within the body of the gasket, as shown by the ring in solid lines in FIG. 4, so that the length of the intermediate planar region (shown as "$l_1$" as viewed in the cross-section of FIG. 4) extends in length at least one ring thickness towards the tip 23 of the nose region 21. This distance or length is illustrated as "$d_1$" in FIG. 4. Also, the reinforcing ring 41 is located so that there is a distance "$d_2$" of at least one ring thickness between the rigid reinforcing ring 41 and the internal diameter of the gasket body defined by the exterior surface of the intermediate planar region 27. A "ring thickness" is shown as "$t_1$" in FIG. 4.

It will be appreciated that the thickness of the steel ring will vary with pipe size. For DN 100 (pipe Od 118 mm), for example, it is gauge 12=2.7 mm thickness. For DN 600 it the gauge number goes down to 3, which corresponds to 6.2 mm. For each size, there is a preferred gauge, but there is some room for variation, generally about 1 gauge number up (thinner) or down (thicker). So, the rigid reinforcing ring has a defined ring diameter or thickness for each pipe size and corresponding gasket.

Another way of describing the ring location and thickness is to say that the preferred ring thickness is between 20% and 24% of the nominal radial gap between the male, spigot pipe OD and the groove or raceway ID in the female, belled pipe end. In the case of the (Brazilian DEFOFO) DN 500 (pipe OD 535.8), which was selected as the critical case for design, the ring thickness selected was as has been described above. However, it will be thinner in smaller size pipes and thicker in larger size pipes.

Figure 5:
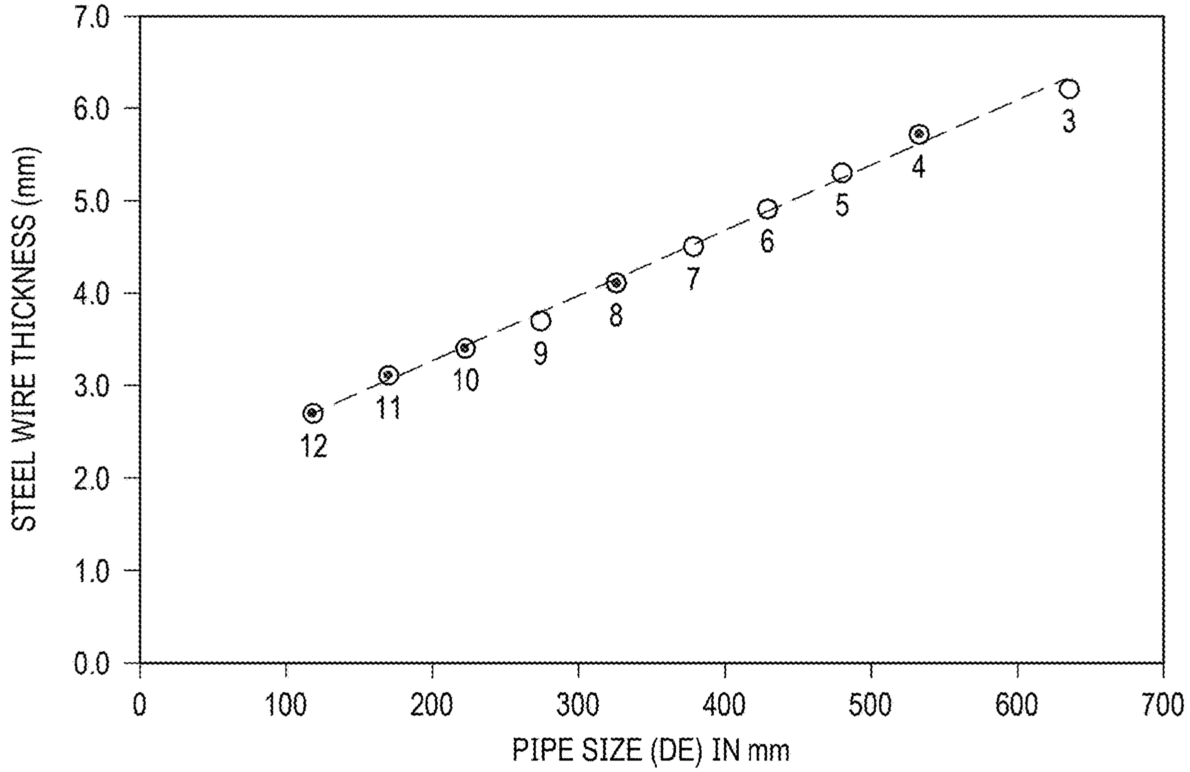
FIG. 5 is a graph of the thickness of the reinforcing ring versus pipe size for the reinforcing rings used with the gaskets of the invention.

The graph in FIG. 5 summarizes how ring gauge and thickness vary with pipe OD (DE in the Brazilian standard).

Having a "short nose region" on the gasket fails to comply with these design rules. While a "short nose" may provide enough distance between the reinforcing ring and the internal diametral wall of the gasket (the wall 27 in FIG. 4), it doesn't extend far enough to provide the needed support for the steel ring toward the top of the nose. The void area (generally at 33 in FIG. 4) ahead of the reinforcing ring cause it to trip or collapse and undergo excessive deformation under some pressure conditions.

Additionally, in a most preferred case, the gasket body at the nose region 21 has a nominal internal diameter and the mating spigot pipe end (11 in FIG. 1) has a nominal outer diameter, and wherein the nose nominal internal diameter is approximately equal to the nominal spigot outer diameter.

The following method can be used for installing a sealing gasket of the invention within a preformed gasket-receiving groove provided within the bell end of a pipe section. The bell end has a mouth opening which is engageable with a spigot end of a mating pipe section to form a pipe joint. The pipe section having the bell end is first oriented along a longitudinal work axis. A sealing gasket is then inserted within the mouth opening of the bell end. The sealing gasket is oriented at an oblique angle with respect to the longitudinal work axis, whereby a leading edge of the sealing gasket moves past the annular groove provided in the bell end. A retracting force is then exerted on the sealing gasket by pulling the leading edge thereof backwards in the direction of the mouth opening of the bell end until the gasket snaps into a locked-in position within the annular groove.

An invention has been provided with several advantages. A dramatic improvement in performance is achieved by extending and thickening the gasket nose region. The proper application of the design principles of the invention, as explained above in the written description, prevent gasket blowout during pressure tests at twice the rated pressure. This greatly improved result is totally unexpected.

While the invention has been shown in several of its forms, it is not thus limited but is susceptible to various changes and modifications without departing from the spirit thereof.

What is claimed is:

1. A snap-fit pipe sealing gasket designed for receipt within a preformed groove provided within a female socket end of a joint of thermoplastic pipe, the snap-fit pipe sealing gasket comprising:

a ring-shaped elastomeric body having a substantially homogeneous composition which, when viewed in cross section, includes a leading nose region which terminates in a nose tip, the leading nose region being connected to a downwardly extending compression region by an intermediate planar region which forms a flat surface parallel to a horizontal axis drawn parallel to a central axis of the thermoplastic pipe, the leading nose region facing towards the female socket end of the thermoplastic pipe once the gasket is inserted within the thermoplastic pipe;

wherein the leading nose region is joined to the intermediate planar region by a leading sloped surface region which defines an angle α with respect to the horizontal axis drawn parallel to the central axis of the thermoplastic pipe, wherein the leading sloped surface region forms an alignment ramp to guide a mating spigot end during insertion;

wherein the downwardly extending compression region comprises an evenly sloping outer face of the gasket body which forms a lip region thereof, the lip region being separated from a trailing outer face of the gasket body by means of a V-shaped opening which defines a second angle β, the V-shaped opening allowing the lip region to bend inwardly as the mating spigot end inserts to define a mating thermoplastic pipe section that encounters the lip region of the gasket, the trailing outer face of the gasket body forming a convex outer arcuate region which is connected to the nose region by a uniformly sloping exterior gasket surface;

the gasket body having a rigid reinforcing ring embedded therein which circumscribes a gasket interior at one circumferential location, the rigid reinforcing ring having a defined mid-point and a defined ring diameter or thickness which is on the order of 2.0 mm to 7.0 mm; and wherein the intermediate planar region has a given length defined between two vertical axes, and wherein the rigid reinforcing ring is positioned within the body of the gasket so that the length of the intermediate planar region extends at least one additional ring diameter or thickness towards the nose tip, so that the additional ring diameter or thickness is contained entirely between the two vertical axes, and wherein the reinforcing ring is located so that there is a distance of at least one ring diameter or thickness between the rigid reinforcing ring and the flat surface of the intermediate planar region.

2. The snap-fit pipe sealing gasket of claim 1, wherein gasket body at the nose region has a nominal internal diameter and the mating spigot pipe end has a nominal outer diameter, and wherein the nose nominal internal diameter is approximately equal to the nominal spigot outer diameter.

3. The snap-fit sealing gasket of claim 1, wherein the angles α and β are selected to minimize the insertion force required when inserting the mating spigot end within the female socket end while still maintaining a compression seal between the mating spigot end and the female socket end.

4. The snap-fit pipe sealing gasket of claim 1, wherein the angle α is selected to be less than 60 degrees and the angle β is selected to be greater than 45 degrees.

5. The snap-fit pipe sealing gasket of claim 4, wherein the angle α is selected to be approximately 30 degrees and the angle β is selected to be approximately 90 degrees.

6. A snap-fit pipe sealing gasket designed for receipt within a preformed groove provided within a female socket end of a joint of molecularly oriented thermoplastic pipe, the snap-fit pipe sealing gasket comprising:

a ring-shaped elastomeric body having a substantially homogeneous composition which, when viewed in cross section, includes a leading nose region which terminates in a nose tip, the leading nose region being connected to a downwardly extending compression region by an intermediate planar region which forms a flat surface parallel to a horizontal axis drawn parallel to a central axis of the thermoplastic pipe, the leading nose region facing towards the female socket end of the thermoplastic pipe once the gasket is inserted within the thermoplastic pipe, the downwardly extending compression region forming a primary sealing surface for the gasket;

wherein the leading nose region is joined to the intermediate planar region by a leading sloped surface region which defines an angle α with respect to the horizontal axis drawn parallel to the central axis of the thermoplastic pipe, wherein the leading sloped surface region forms an alignment ramp to guide a mating spigot end during insertion;

wherein the downwardly extending compression region comprises an evenly sloping outer face of the gasket body which forms a lip region thereof, the lip region being separated from a trailing outer face of the gasket body by means of a V-shaped opening which defines a second angle β, the V-shaped opening allowing the lip region to bend inwardly as the mating male spigot end of the mating thermoplastic pipe section encounters the primary sealing surface of the gasket, the trailing outer face of the gasket body forming a convex outer arcuate region which connected to the nose region by a uniformly sloping exterior gasket surface, the outer face of the gasket forming a secondary sealing surface which seals with the preformed groove provided in the female socket end of the thermoplastic pipe, wherein the female socket end is belled;

the gasket body also having a rigid reinforcing steel ring embedded therein which circumscribes a gasket interior at one circumferential location, the rigid reinforcing steel ring having a defined mid-point and a defined ring diameter or thickness which is on the order of 2.0 mm to 7.0 mm, and wherein the intermediate planar region has a given length defined between two vertical axes, and wherein the rigid reinforcing steel ring is positioned within the body of the gasket so that the length of the intermediate planar region extends at least one additional ring diameter or thickness towards the nose tip, so that the additional ring diameter or thickness is contained entirely between the two vertical axes, and wherein the body of the gasket also extends at least one ring thickness between the rigid reinforcing steel ring and the flat surface of the intermediate planar region.

7. The snap-fit pipe sealing gasket of claim 6, wherein gasket body at the nose region has a nominal internal diameter and the mating spigot pipe end has a nominal outer diameter, and wherein the nose nominal internal diameter is approximately equal to the nominal spigot outer diameter.

8. The snap-fit pipe sealing gasket of claim 7, wherein the gasket body is installed within a mouth opening of the belled end of the thermoplastic pipe with the gasket body being initially oriented at an oblique angle with respect to the central axis such that a trailing edge of the gasket body engages the preformed groove, and a leading edge of the gasket body is moved past the preformed groove provided in the bell end;

and wherein the gasket body can be finally installed within the preformed groove by exerting a retracting force on the gasket body by pulling the leading edge thereof backwards in the direction of the mouth opening of the female pipe end until the gasket snaps into a locked-in position within the preformed groove.

9. The snap-fit sealing gasket of claim 8, wherein the thickness of the rigid reinforcing ring will be thinner in smaller size pipes and thicker in larger size pipes.

* * * * *